INVENTOR.
ROBERT S. JAMIESON

ATTORNEYS

United States Patent Office 3,348,060
Patented Oct. 17, 1967

3,348,060
CONTINUOUSLY-OPERATING STANDBY POWER-SUPPLY AND BATTERY-CHARGING APPARATUS AND METHOD
Robert S. Jamieson, San Juan Capistrano, Calif., assignor, by mesne assignments, to Lorain Products Corporation, Lorain, Ohio, a corporation of Ohio
Filed Jan. 14, 1964, Ser. No. 337,621
15 Claims. (Cl. 307—66)

This invention relates to an apparatus and method for maintaining a storage battery-inverter combination continuously associated within A.C. power line in such manner that the inverter derives the necessary idling power from the line, and in such manner that the battery may be rapidly recharged after a period of supplying energy to the line, in the absence of any switching or power interruption of any sort.

It is a highly important object of the present invention to provide a continuously-operating standby power-supply apparatus which incorporates, as an integral part thereof and without need for an auxiliary or separate battery charger, means operative to maintain the storage battery charged to a desired value at all times except during periods when the standby system is the sole supplier of power to the load, and further operative to re-charge the battery after resumption of the line voltage, all without effecting even a momentary disablement of the system.

A further object is to provide a method of effecting, in the absence of switching, an efficient and precisely controlled exchange of energy between a storage battery and an A.C. power line associated therewith.

An additional object is to provide a combination inverter and battery-charger system characterized by a very precise control of the energy exchange between the battery and the line, such control being effected without material loss of power and without any interruption in the standby capability of the system.

These and other objects will be come apparent from the following detailed description taken in connection with the accompanying drawings in which.

Figure 4:
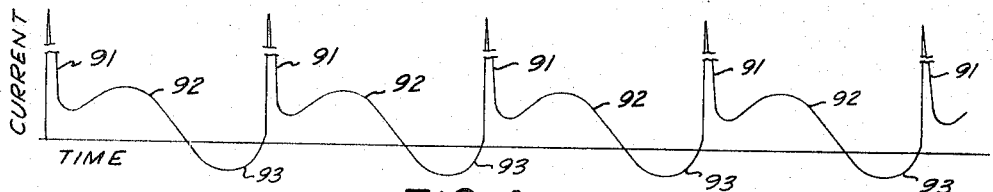
FIGURE 4 is a diagram showing the general wave form of the current flowing through the battery lead during periods when the voltage output of the standby power-supply system is in phase with the line voltage.
Figure 5:
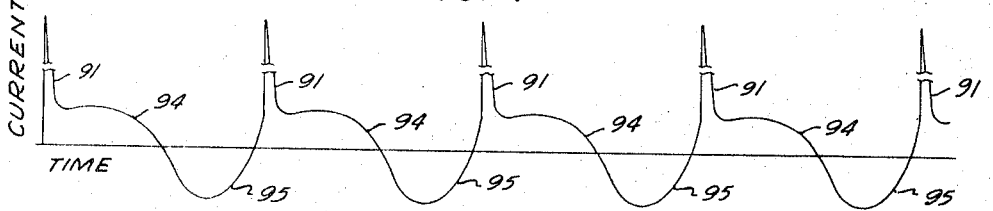
Figure 6:
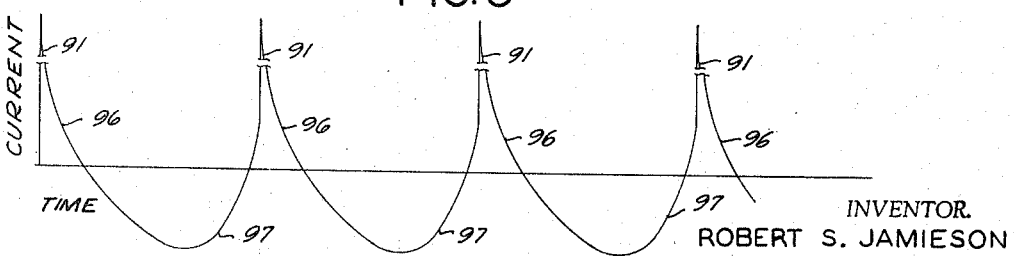

FIGURE 5 is a current diagram corresponding to FIGURE 4, but showing the condition which occurs when the phase of the output voltage wave from the standby power-supply system is retarded somewhat, the amount of retardation being such that there is no net current flow in the battery lead; and FIGURE 6 is a corresponding current diagram showing the condition occurring when the phase of the standby power-supply output voltage wave is further retarded, so that substantial charging of the battery occurs.

The method and apparatus will first be described in the absence of those components which relate only to charging of the battery, following which the battery-charge control will be described and related to the entire system. It is emphasized, however, that this manner of description is not in derogation of the battery-charging apparatus and method, which constitutes an extremely important portion of the present invention.

Because the output of the present standby power-supply system is always directly connected to the A.C. power line, the voltage wave delivered to the line from such system will necessarily be in phase with the line voltage wave. However, it is convenient to refer to a phase shift between the line voltage wave and the output wave from the standby system. When such a reference is made, it is to be understood as denoting the phase relationship which would occur if the line were open (as by operation of the line control to open-circuit condition).

Figure 1:
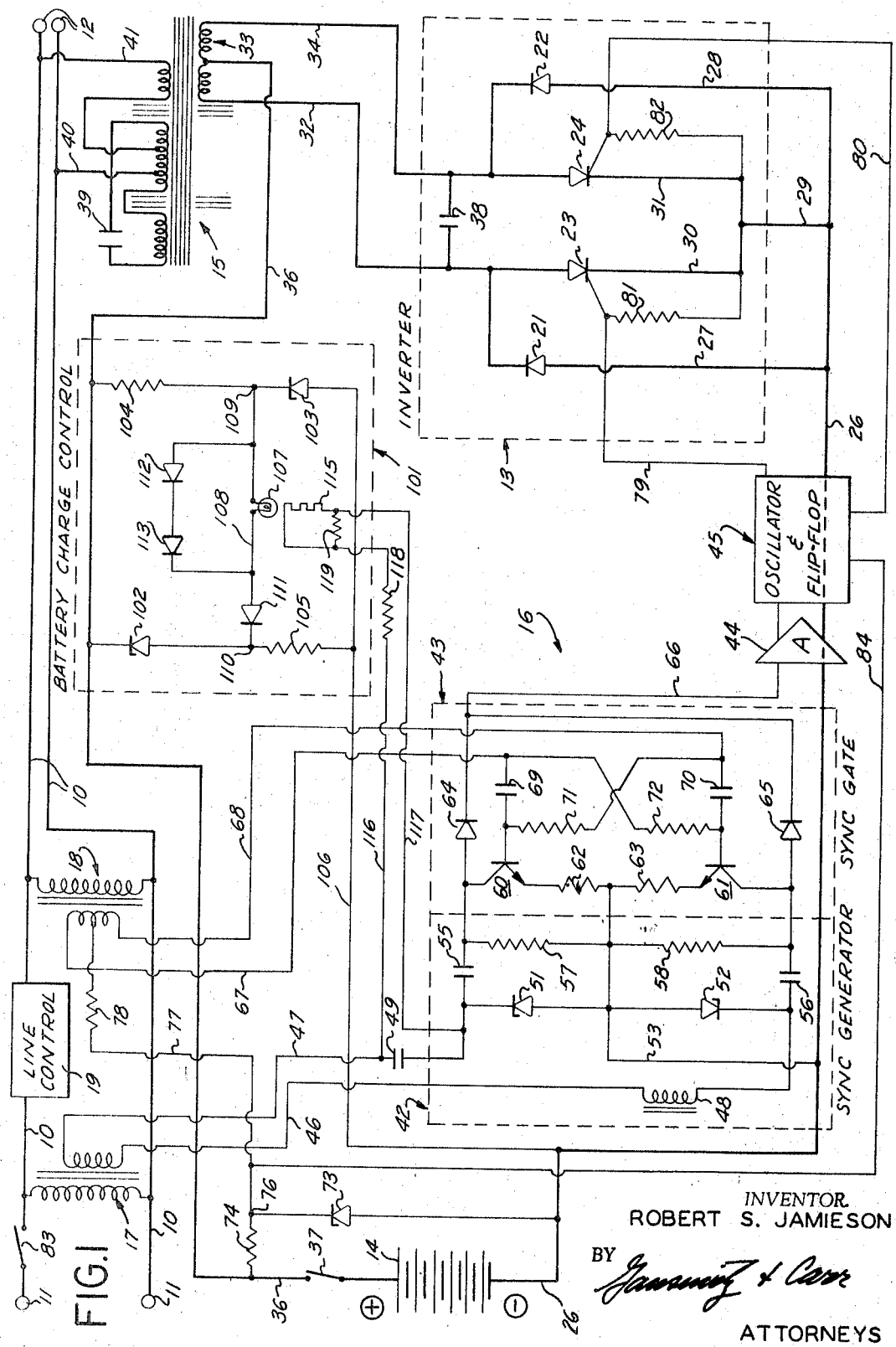
FIGURE 1 is a wiring diagram illustrating schematically the standby power-supply apparatus including the means and method for effecting charging of the battery.

Referring to FIGURE 1, the invention is illustrated as associated with a conventional A.C. power line 10 (or other source of A.C. power) through which an alternating voltage wave having a substantially predetermined magnitude, frequency and wave form is normally passed. Input terminals 11 of the line are normally connected to a conventional source of A.C. power, such as a generator or transmission line adapted to deliver a 60-cycle 110-volt sinusoidal voltage wave. The output terminals 12 of line 10 are adapted to be connected to a suitable load which may be either resistive or reactive in nature.

The components of the present power-supply system include an inverter 13 adapted to supply power to line 10 from a storage battery 14, at least during periods when there is a break in the line or when the line voltage is not within a desired range. The apparatus further includes a coupling means 15 (normally a transformer) to connect the inverter output continuously to the line in such manner that the standby power-supply system will float in parallel with the line without creating adverse conditions, and permitting the phase and magnitude of the output voltage wave of the standby system to adjust automatically to variations in the line voltage wave. Additional important components of the system include means to maintain the output voltage wave from the standby system synchronized in frequency and generally correlated in phase with the line voltage wave, such means being indicated generally by the number 16 and also including sensing or monitoring means 17 and 18 associated with line 10 on opposite sides of a line control means 19. It is pointed out that the line control 19 is not necessary in those cases where there is a break in the line, but is necessary in order to protect the present standby system from the effects of such conditions as a short in the line.

*Description of the inverter 13 and transformer 15*

The inverter 13 comprises a suitable means for converting D.C. power from battery 14 into an alternating voltage wave for delivery to the transformer 15, and consequent supply of A.C. power to line 10. For reasons including the battery-charging function to be described in detail subsequently, the inverter includes a suitable means for returning current from the line to the battery. Thus, the inverter is bidirectional.

Stated more definitely, inverter 13 is a parallel inverter incorporating clamping, reactance or feedback diodes, the latter being indicated at 21 and 22. Preferably, the inverter is a square-wave SCR (silicon controlled rectifier) inverter, incorporating first and second SCR's 23 and 24 which are reverse-oriented relative to the diodes 21 and 22. Such an inverter is described on page 152 et seq. of the General Electric SCR Manual, Second Edition. It is to be understood that thyratrons, ignitrons, etc., may be employed in place of the SCR's.

The inverter is connected to the negative terminal of battery 14 by means of a negative or ground lead 26. Such lead is connected through leads 27 and 28 to the anodes of diodes 21 and 22, respectively. In addition, the negative lead 26 is connected through leads 29, 30 and 31 to the cathodes of SCR's 23 and 24. The cathode of diode 21, and the anode of SCR 23, are connected through a lead 32 to one end terminal of the primary winding 33 of transformer 15. Correspondingly, the cathode of diode 22 and the anode of SCR 24 are connected through a lead 34 to the other end terminal of the primary 33.

The indicated SCR inverter requires the use of a suitable commutating means, typically a capacitor such as the one indicated at 38. Such capacitor is bridged across the inverter output, between the leads 32 and 34.

A center tap on primary 33 is connected through a positive lead 36 to a suitable switch 37, such switch being in turn connected to the positive terminal of battery 14. Switch 37 is preferably a circuit breaker responsive to overload conditions in the standby power-supply system.

When switch 37 is closed, a complete circuit exists between the battery 14 and inverter 13. During periods when the standby system is supplying power to line 10, current flows through the indicated inverter circuit in a clockwise direction, that is to say from battery 14 through lead 36 to the inverter, thence through lead 26 back to the battery. During periods when the battery is being charged as will be described subsequently, energy flows through the circuit in the reverse or counterclockwise direction. As will be explained hereinafter, power may be supplied from the battery to the line, and returned from the line to the battery, during different portions of each half-cycle of the voltage wave. It is pointed out that the current which flows in the indicated clockwise direction, from the battery to the line, must pass through SCR's 23 and 24, whereas the current which flows in the counterclockwise direction from the line to the battery must pass through diodes 21 and 22.

The operation of inverter 13 will now be summarized, particularly since it aids in the understanding of the battery-charging aspect of the invention. The direct voltage obtained from battery 14, or from an equivalent source such as a D.C. line, is converted by the inverter into a square-wave alternating voltage, which voltage is fed to the transformer primary 33. The SCR's 23 and 24 alternately connect the end terminals of primary 33 to one of the battery terminals, the center tap of the transformer being connected to the other battery terminal. In such manner, the battery voltage (ignoring in all instances the voltage drops in the SCR's and diodes) is impressed on each half of the primary winding, in push-pull relationship. The capacitor 38 alternately charges to the full primary voltage, then discharges through the SCR's to commutate the conduction thereof.

Let it be assumed, for example, that both SCR's are initially non-conducting, and that a suitable pulse or square wave (of the proper magnitude and at the desired repetition rate) is fed to the gate of SCR 23. SCR 23 then fires and impresses the battery voltage on the left half (as viewed in the drawing) of primary 33, through a circuit including leads 36, 32, 30, 29 and 26. The voltage thus present in the left half of primary 33 reflects across the entire primary, by autotransformer action, a voltage equal to twice the battery voltage. This results in rapid charging of commutating capacitor 38 to twice the battery voltage, the right side of the indicated capacitor 38 being of positive polarity.

Upon completion of the first half-cycle interval, a like pulse or gating signal is supplied to the gate of SCR 24 to effect firing thereof. Both SCR's then conduct simultaneously, causing the capacitor 38 to discharge therethrough in a clockwise direction, the current flow being downwardly through SCR 24 and upwardly through SCR 23. The indicated reverse current flow through SCR 23 causes the same to cease conducting as soon as the junctions thereof are swept free of current carriers. Since SCR 24 is in conduction, the voltage of battery 14 is impressed across the other half of primary 33, namely the right half thereof as shown in the drawing. This reflects a voltage of twice the battery voltage across the entire primary but with a polarity the reverse of that indicated previously, the left side of capacitor 38 being positive.

Upon completion of the second half-cycle, SCR 23 is again triggered. Capacitor 38 then discharges through both SCR's and in a counterclockwise direction, so that the reverse current flow through SCR 24 causes it to cease conducting, thereby completing the cycle.

In the absence of diodes 21 and 22, the described inverter is characterized by several well-known disadvantages. One such disadvantage is that the output voltage varies from a square wave when the inverter is only lightly loaded. This is because, in accordance with Lenz's law, the interruption of current flow through the primary 33 effects generation of a high reverse voltage in an attempt to maintain the current flow. Such high voltage is clipped, however, by the diodes 21 and 22 which hold the square wave across each half of primary winding 33 to the battery voltage (plus the diode drop of approximately one volt). The square wave is thus preserved even when the inverter is only lightly loaded.

A further known function of the diodes 21 and 22 is to permit the inverter to be employed with reactive loads, both inductive and capacitive. When the load on the inverter is reactive, load current flows in out-of-phase relationship relative to the square-wave voltage. It follows that during a portion of each half-cycle, which portion is proportional to the phase angle, current attempts to flow in opposition to the drive voltage. Such reverse-current flow turns off the conducting SCR prior to the above-indicated time when the capacitor 38 discharges in the reverse direction through one of the SCR's. Accordingly, in the absence of the diodes 21 and 22 there would exist an interval when primary 33 would be cut off from the battery 14, so that the voltage across the primary would rise to an excessively high value. The diodes 21 and 22 operate to permit the reactive current to flow back to the battery during the indicated interval, thus clipping the high inductive voltage.

Let it be assumed, for example, that SCR 23 is conducting but that the current therethrough goes to zero and then reverses direction prior to the time SCR 24 is fired. The indicated reverse current extinguishes SCR 23 and flows through diode 21 for the remainder of the half-cycle. As previously pointed out, such flow through diode 21 is in a direction to effect charging of battery 14. This is important to the battery-charging feature of the circuitry, and will be discussed hereinafter.

Proceeding next to a description of the coupling means 15, this comprises a ferroresonant transformer, or any equivalent thereof, adapted to correlate the inverter output voltage wave to the line voltage wave. Such transformer (when fed by a square-wave inverter) incorporates a suitable means, such as a reactive filter, for converting the square-wave input into a sinusoidal output. Thus, the sinusoidal wave form of the line voltage wave is substantially matched.

The indicated ferroresonant transformer is a harmonic-suppressing regulating transformer of the general type referred to on page 165 of the General Electric SCR Manual, Second Edition. Such transformer includes a capacitor 39 connected between end terminals of two of the windings.

The ferroresonant transformer permits the phase of the voltage wave across primary 33 to be shifted to a large degree, relative to the line voltage wave, without causing undesired circulating currents or other adverse effects. This is another important factor relative to the battery charging aspects of the present invention. Furthermore, such transformer permits the magnitude of the inverter output voltage to adjust, again without resulting in harmful effects, to variations in the magnitude of the line voltage.

The above and certain other functions performed by the ferroresonant transformer, and associated harmonic-suppressing means, are: (a) to convert the square wave passing through primary 33 into a generally sinusoidal wave which is impressed across line 10 by means of output leads 40 and 41, (b) to increase the output impedance of inverter 13 and thereby reduce to a low value undesired circulating currents between the inverter and the line, (c) to adjust the phase and magnitude of the inverter output voltage wave to the phase and magnitude of the line voltage wave, and (d) to protect the inverter against short circuits, the primary current being limited to a low valve even during short circuiting of the secondary.

*Description of synchronizing means 16, and of the associated means for triggering the gates of inverter 13*

There will next be described the apparatus 16 and the method for synchronizing the inverter 13 to the line voltage wave, and for correlating generally the phase of the output voltage wave from the standby system to the line voltage wave. Such means includes the previously-indicated sensing or monitoring means 17 and 18, a sync generator 42, a sync gate 43, an amplifier 44, and an oscillator and flip-flop 45, the latter being connected to the gates of SCR's 23 and 24. Sync generator 42 is operatively associated with the first sensing means 17, which is located on the input side of line control 19, whereas the sync gate 43 is operatively associated with the sensing means 18 on the output side of the line control.

The first sensing means 17 may comprise a step-down transformer the input side of which is connected across the line 10 and the output side of which is connected through leads 46 and 47 to an inductor 48 and a capacitor 49, respectively. Inductor 48 forms part of the sync generator, which is a squaring and differentiating circuit adapted to generate pulses for feeding to the oscillator and flip-flop 45 under control of sync gate 43. The function of the capacitor 49 is described hereinafter, relative to battery charge control 101.

Stated more definitely, sync generator 42 is illustrated to comprise (in addition to inductor 48) back-to-back zener diodes 51 and 52 the cathodes of which are connected, respectively, to capacitor 49 and inductor 48. The junction between the zeners is connected through a lead 53 to the negative D.C. or ground lead 26. Thus, the junction between the zeners is referenced to the negative battery voltage.

The zeners 51 and 52 have corresponding breakdown voltages which are much lower than the peak voltage of the A.C. voltage wave derived from the secondary of transformer 17, the result being that the zeners clip off the peaks of the sine wave to produce a wave shape which would be generally trapezoidal were it not for the inductive kick, or flyback effect, produced by inductor 48. Because of the presence of the inductor 48, the front and trailing edges of the clipped sine wave are squared to produce a push-pull square wave.

Let it be assumed that the upper terminal of the secondary of transformer 17 is positive and exceeds the breakdown voltage of zener diode 51. There will then be a voltage drop across the zener 51 equal to the breakdown voltage thereof, for example 13 volts. Because the zeners 51 and 52 are back to back, the voltage across the forwardly-biased zener 52 will only be low, approximately one volt. During the next half-cycle of the sine wave input, the second zener 52 produces the clipping action at the breakdown voltage thereof (such as 13 volts), and the first-mentioned zener 51 generates only a low voltage. Although the indicated A.C. circuit includes both leads 46 and 47, as well as the inductor and capacitor, it is to be noted that the reference lead 53 causes the voltage of each half of the square wave to be referenced to ground.

The differentiating network comprises two capacitors 55 and 56 connected, respectively, to the cathodes of zeners 51 and 52. The remaining terminals of the capacitors are connected through resistors 57 and 58 to the above-indicated reference or ground lead 53.

Each of the capacitors 55 and 56 differentiates the associated square-wave input to form two pulse trains of sixty positive pulses per second and sixty negative pulses per second, the pulse trains being 180 degrees out-of-phase. The resistors 57 and 58 assure that there will always be discharge paths for the capacitors 55 and 56.

Sync gate 43 is illustrated to comprise first and second NPN transistors 60 and 61 the collectors of which are connected to capacitors 55 and 56, respectively. The emitters of such transistors are connected through current-limiting resistors 62 and 63 to the reference or ground lead 53. The collectors of the transistors are also connected through diodes 64 and 65, respectively, to an output lead 66 which supplies the sync signal through amplifier 44 to the oscillator and flip-flop 45. Such diodes are correspondingly oriented, the anodes thereof being connected to the collectors.

There will next be described the circuitry for associating the second sensing means 18 to the bases of transistors 60 and 61, to cut off such transistors when, and only when, the phase of the voltage wave across line 10 on the output side of line control 19 corresponds generally to the phase of the voltage wave across line 10 on the input side thereof. The sensing means 18 is illustrated to comprise a step-down transformer the primary of which is connected across the line on the output side of the line control, and the secondary of which is connected through leads 67 and 68 and coupling capacitors 69 and 70 to the bases of transistors 60 and 61, respectively. The transistor bases are cross-coupled for biasing purposes, the base of transistor 60 being connected through biasing resistor 71 to the junction between lead 68 and capacitor 70, and the base of transistor 61 being connected through a biasing resistor 72 to the junction between lead 67 and capacitor 69.

The bias voltage for the transistors 60 and 61 is derived from battery 14, for example by means of a voltage-reducing and stabilizing means including a zener diode 73 having a breakdown voltage less than the normal battery voltage. The cathode of zener 73 is connected to the positive battery lead 36 through a resistor 74. The junction 76 between resistor 74 and the zener cathode is thus caused to be at a voltage, with respect to ground lead 26, which is much less than the battery voltage. For example, the voltage at junction 76 may be 25 volts while the battery voltage is 52 volts.

A lead 77 and limiting resistor 78 are connected between junction 76 and a center tap on the secondary of transformer 18. The positive voltage from the junction is thus supplied to opposite ends of the transformer secondary, and thus through leads 67 and 68 and biasing resistors 72 and 71 to the transistor bases. Therefore, in the absence of an A.C. signal from the transformer, the transistors 60 and 61 are maintained in saturated condition and effect shorting of the positive pulses from differentiating capacitors 55 and 56 to ground lead 53. The negative pulses are not passed to ground, due to the unidirectional characteristics of the transistors. The negative pulses are, however, blocked by diodes 64 and 65.

The A.C. voltage present in transformer 18, when inverter 13 is in operation and/or when line control 19 is closed, causes the transistors 60 and 61 to be cut off in alternation. Positive pulses from capacitors 55 and 56 are then prevented from passing to the ground lead 53, being instead fed through the diodes and through lead 66 to the oscillator and flip-flop 45. To accomplish the above, the transformer output voltage is so selected that it will alternately overcome the D.C. bias from junction 76, on opposite halves of the transformer secondary.

The various circuit values, winding relationships, etc., are so selected that transistors 60 and 61 will be cut off only during periods when the line voltage wave present across line 10 is generally in phase with the voltage wave supplied to leads 40 and 41 (and thus to line 10) by the inverter. The transistors being cut off, sync signal will be transmitted to oscillator and flip-flop 45, and synchronization will occur. When the indicated voltage waves are not generally in phase, the sync signal is grounded through the saturated transistors, and synchronization will not occur. Thus, the sync gate assures that synchronization will not occur when the voltage waves are 180 degrees out of phase, which would produce severe adverse transient conditions.

The battery charge control, to be described subsequently, cooperates with capacitor 49 to provide varying degrees of phase shift of the sync signal. However, the various relationships are so selected that the phase shift effected by the battery charge control, and various phase shifts effected by other components, are not sufficient to permit the sync gate 43 to pass sync signal when the voltage waves on opposite sides of the line control are not generally in phase. This statement is, however, not to be understood as indicating that battery charging cannot occur where the phase shift is more than 90 degrees from the precisely in-phase condition. Instead, charging also occurs where the phase shift approaches 150 degrees, for example, from the in-phase condition. This results, however, in severe transient effects when the line control closes.

The phase "generally in phase," as employed in the present specification and claims, denotes not only the precise in-phase condition but also phase conditions within 90 degrees from each side of the in-phase condition. Stated otherwise, it denotes conditions which are nearer the precisely in-phase condition than the 180 degree out-of-phase condition.

The diodes 64 and 65 not only assure that no negative pulses will pass to the output lead 66, but also form an "and" gate to add the outputs (positive pulse trains) into a single 120 cycle pulse train. Such pulse train of 120 pulses per second operates effectively to synchronize the output of oscillator and flip-flop 45 to the line frequency of 60 cycles. Therefore, it will be understood that the described circuitry provides a frequency-doubling action which is important in synchronizing the oscillator and flip-flop 45. This action is achieved by means of a gating signal (from transformer 18) which is not at the double frequency but is instead at the source or base frequency derived from transformer 17.

Stated differently, the described sync gate 43 and associated circuitry provide a simple and effective means for supplying a 120 cycle pulse train to the oscillator and flip-flop 45, in response to the phase relationship between two 60 cycle sources, namely the line (at transformer or sensing means 17) and the output from the standby system (at transformer or sensing means 18). In accordance with the method to be described hereinafter, the line control is not closed until after the proper frequency and phase relationships are present at the sensing means 17 and 18.

Amplifier 44 may be of any suitable type known to the art and adapted to amplify the sync signal. Such amplifier may be of a conventional type which effects phase inversion, so that the positive 120 c.p.s. pulse train becomes negative.

The oscillator and flip-flop 45 may comprise a conventional relaxation oscillator which is suitably connected to a flip-flop. For example, the circuit 45 may comprise the square-wave inverter trigger circuit described on page 155 et seq. of the General Electric SCR Manual, Second Edition. Such circuit is a conventional unijunction transistor relaxation oscillator associated with a conventional transistor flip-flop. Reference is also made to pages 50 and 52 of such Manual, which provide a description of the oscillator and of the method of injecting the sync signal. It is to be remembered that the output from the oscillator and flip-flop 45 is at half the frequency of the sync signal, or 60 cycles per second.

The output of the oscillator and flip-flop circuitry 45 is connected through leads 79 and 80 to the gates of SCR's 23 and 24 in the inverted circuit 13, such gates being connected in conventional manner through resistors 81 and 82 to the negative or ground leads 29 and 26. Thus, the inverter is synchronized to the line voltage wave in the described manner, and with the desired phase relationship between the voltage waves on opposite sides of the line control 19.

The relaxation oscillator which forms part of the circuit 45 incorporates conventional control means to adjust the free-running frequency (with no sync signal) within a predetermined range. Such control means is set to effect oscillation at a frequency slightly lower than line frequency, in order that the above-described synchronization action may occur. For example, the oscillator may be set to oscillate at 58 cycles per second. This means that when the sync generator 42 and sync gate 43 are in operation, during the entire time when line power is present, the oscillator will be synchronized to the 60 cycle frequency. However, upon failure of the line the oscillator will produce 58 cycle oscillations and will cause operation of the inverter at 58 cycles. Such two-cycle frequency difference is stated merely for purposes of illustration, and may be made less if desired. Furthermore, it is to be noted that synchronism continues during periods when line control 19 is opened as the result of an overvoltage, or as the result of a reduced voltage which is still sufficiently high to drive the sync generator. With the described two-cycle difference, the line frequency and the inverter output frequency will result in two beats per second, so that the indicated synchronization action will occur in less than half a second.

In place of the indicated oscillator and flip-flop 45, the means for supplying triggering pulses to the SCR gates may comprise, for example, a free-running multivibrator, a squared-off sine wave oscillator, or like circuitry.

*Description of the line control 19, and of the method of floating the standby power-supply system on the line*

The line control 19, which is interposed between the above-described phase and frequency-sensing means 17 and 18, is adapted to respond to variations in line voltage outside of a prescribed operating range. Thus, the line control is adapted automatically to respond to short circuits in the line, to excessively low voltages in the line, and to excessively high voltages therein. Reference is made, for one type of a line control adapted to respond to low line voltages, to Patent 2,263,320, issued Nov. 18, 1941, for Power Supply Circuit Employing Electrical Converters. The line control may also, or alternatively, be made responsive to other characteristics (such as frequency) of the line voltage wave.

Although the line control 19 is preferably extremely fast or relatively fast in its operation in breaking the line circuit when the line voltage is not within a predetermined range, it is important that the line control incorporate means to effect a delay period prior to closing the line circuit. This delay period is desirable in order to permit the sync generator 42 and associated circuitry to commence functioning prior to the time the line control 19 effects its circuit-closing function, and to afford time for the above-indicated synchronization action between the line voltage wave and the inverter voltage wave. Furthermore, it is desirable that the line control 19 test or monitor the line voltage wave during a considerable period of time subsequent to resumption of line power, for example subsequent to repair of a break in the line, in order to insure that the line voltage wave is not undergoing undesirable transient conditions. Thus, the line control 19 continuously monitors the line, opens the line when the voltage is excessively low or high, and closes the line a predetermined delay period after the desired line voltage wave is again present.

There will next be described the method of floating the standby power-supply system on the line, and maintaining such system in floating condition relative to the line, particularly as related to line control 19. The word "floating" is intended to denote continuous operation of the standby system, in the absence of any substantial transfer of power from the standby system to the load connected to line terminals 12. To facilitate the description of such method, let it be assumed that there is a switch 83 in the line adjacent input terminals 11, it being emphasized, however, that no such switch is necessary to the operation of the present system.

Let it first be assumed that the entire system is not in operation, all switches being open. Switch 37 in the D.C. lead 36 is then closed to supply energy to the oscillator and flip-flop circuit 45 by means of negative lead 26 and positive lead 84, the latter being connected to junction 76. The relaxation oscillator portion of the circuit 45 then commences to oscillate at a predetermined free-running frequency which should be slightly less than double the line frequency (which double frequency is halved by the flip-flop portion of circuit 45). Trigger signals are thus supplied through leads 79 and 80 to the gates of SCR's 23 and 24 of inverter 13, causing the inverter and the associated ferroresonant transformer 15 to deliver a sine-wave output through leads 40 and 41 to line 10. As previously described, the voltage wave thus supplied to line 10 on the output side of line control 19 corresponds in wave form and magnitude to the line voltage wave, but has a slightly lower frequency. Such voltage wave is sensed by the transformer 18 and supplied through leads 67 and 68 to the sync gate 43.

Line switch 83 is then closed to supply energy to the sensing transformer 17 and thus deliver a voltage through leads 46 and 47 to the sync generator 42. As soon as the line voltage wave and the voltage wave supplied across leads 40 and 41 by the standby system (sensed by transformers 17 and 18, respectively) beat into a generally in-phase condition, the sync gate 43 operates to pass sync signal to the oscillator and flip-flop 45, synchronizing the same to the line voltage wave and causing the standby system output (across leads 40 and 41) to ge generally in phase with the line voltage wave.

The line control 19 is then operated to effect, after a predetermined delay interval, closing of the line so that the line and the standby system are operating in parallel with each other. However, because of the described matching of the line voltage wave to the standby system output voltage wave, because of the characteristics of the ferroresonant transformer 15, and other factors, the power delivered through output terminals 12 to the load is supplied almost entirely by the line 10 and not by the standby power supply. Thus, as indicated above, the standby power supply merely rides or "floats" on the line. There are no substantial undesired circulating currents between the line and the standby power supply, although (as will be described subsequently) current is derived from the line in order to maintain the charge on battery 14.

Should the line break or otherwise become dead, or should the line voltage change to such a value that line control 19 shifts to open-circuit condition even though the line is not dead, the standby power supply operates, with no break whatsoever in continuity, to supply the necessary energy to the load connected to output terminal 12. A break in the line merely prevents supply of voltage to the sync generator 42, so that functioning of the sync gate 43 produces no result and the oscillator and flip-flop 45 operates at its free-running frequency to supply the gates of the SCR's. When the line voltage resumes, the sync generator becomes operative as previously noted, and the cycle repeats upon expiration of the delay interval incident to closing of the line control 19.

Figure 2:
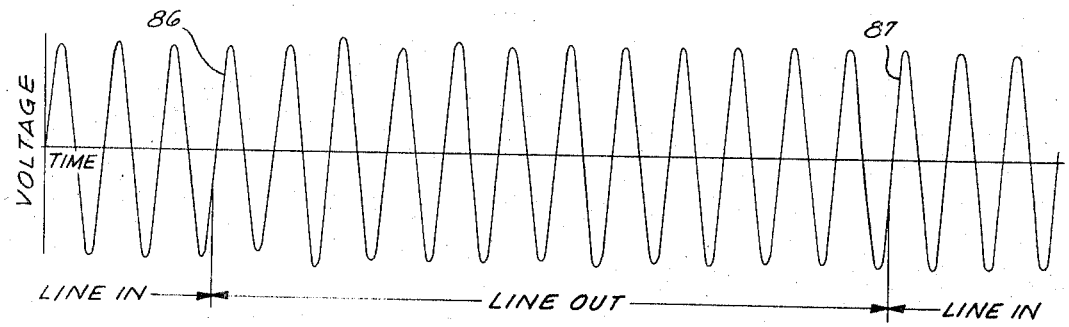
FIGURE 2 is a showing of a typical wave form of the voltage which appears across the line in the absence of load, indicating the conditions which occur prior, during and subsequent to opening of the line.

Referring to FIGURE 2, there is shown the form of a typical voltage wave across the output terminals 12, when there is no load connected to such terminals. At the left side of FIGURE 2 is illustrated the condition when the standby power supply and the line are in parallel, line control 19 being closed. The center portion of the figure illustrates the voltage wave during a period when the line control 19 is open, all energy being derived from the standby power supply, whereas the right side of the figure shows the condition after the line control re-closes. It is to be noted that the voltage wave is substantially continuous at all times, there being only a slightly distortion at the changeover regions 86 and 87 due to phase shift.

Figure 3:
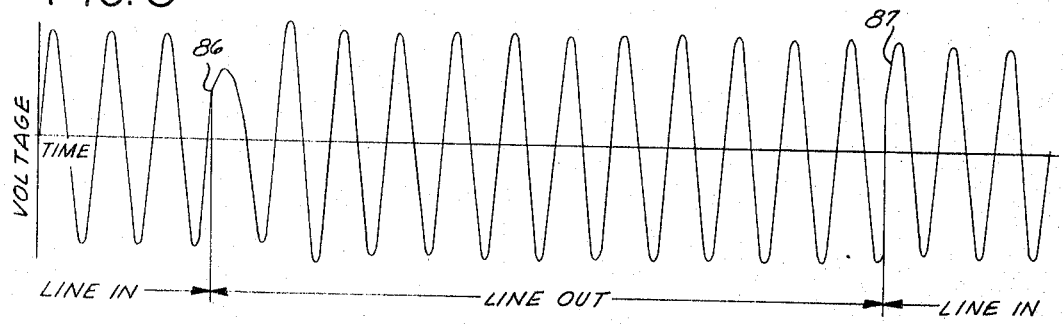
FIGURE 3 is a showing corresponding to FIGURE 2 but illustrating typical conditions which occur during full-load operation.

FIGURE 3 illustrates a corresponding voltage wave as it appears when a full load is connected to terminals 12. The result is generally the same as described relative to FIGURE 2, except that the amount of distortion at the changeover regions 86 and 87 is somewhat greater due to a more pronounced phase shift in the ferroresonant transformer 15.

*Description of the means and method for charging battery 14 from line 10 without at any time disabling the standby power-supply system*

There will next be described the apparatus and method for effecting charging of the battery 14 from line 10, without at any time disabling the standby power-supply system. The charging apparatus costs only a small fraction of the cost of a separate battery-charging means, and does not require additional space.

Stated generally, the apparatus and method accomplish charging of battery 14 by regulating the phase angle between the line voltage wave and the output voltage wave from the standby power supply, in response to the charge on the battery and by means of feedback charge-control circuitry. A progressive retardation of the phase of the standby system output effects, within certain limits, a progressively increasing rate of battery charging. Conversely, a progressive advancing of the phase of the standby system output voltage wave effects a progressively increasing rate of feeding of power from the battery to the line. The latter form of operation may be emloyed to transfer D.C. power from one of the present standby power-supply systems to another. Also, such operation may be employed to discharge an over-charged battery. In the illustrated circuit, the phase-shift effect is achieved by regulating the phase of the signal transmitted to sync generator 42 from sensing transformer 17.

FIGURES 4–6, inclusive, show idealized illustrations (ignoring ringing and other effects not important to the present explanation) of the wave form of the current in one of the battery leads, for example the lead 36 adjacent switch 37. FIGURE 4 shows the current wave form as it appears when the output voltage wave from the standby power-supply system, across leads 40 and 41, is in phase with the line voltage wave. The spikes 91 shown in FIGURE 4 and in FIGURES 5–6 are incident to commutation of the inverter, and may be ignored for purposes of the present discussion in that they have a minor effect upon the energy transfer. The significant point is that the positive portion of the wave, indicated at 92, predominates over the negative portion 93 thereof, which means that there is more current flowing out of the battery 14 in the battery-discharge direction (upwardly through lead 36 from the battery) than is flowing in the battery-charging direction. This discrepancy between the positive and negative current is accounted for substantially entirely by losses in the standby power-supply system itself, there being no net energy transfer between the standby power-supply system and the line 10.

It is to be remembered that substantially all current flow in the battery-discharge direction is generally clockwise through the leads 36 and 26 and through the inverter 13, via the SCR's 23 and 24. Thus, alternate positive portions 92 of the current wave represent current flow through alternate SCR's 23 and 24. Conversely, all current flow in the battery-charging direction is generally counterclockwise through leads 36 and 26 and through the inverter, via the diodes 21 and 22. Thus, alternate negative portions 93 represent current flow through alternate diodes. The distance between adjacent spikes 91 represents one half-cycle of the voltage wave.

FIGURE 5 illustrates the condition which occurs after retardation of the output voltage wave from the standby power-supply system until the positive and negative portions 94 and 95 of the current wave are equal, there then being no net current flow into or out of the battery. This condition is achieved after only a few degrees of retardation of the phase of the voltage output of the standby power-supply system. Typically, this condition may be effected by retarding the sync signal 8 to 12 degrees, to compensate for the phase shift in the transformer 15 at no load. When this more normal condition occurs, the losses inherent in continuous operation of the standby power-supply system are supplied from the line, not from the battery as in the case discussed relative to FIGURE 4. Thus, there is some net transfer of energy between the line and the standby power-supply system, the amount of such energy transfer being just enough to supply the losses in the system.

Referring next to FIGURE 6, a condition is illustrated wherein the phase of the voltage output from the standby power-supply system has been retarded to a much greater degree, for example 60 degrees. The positive portions 96 (representing current flow through the SCR's as energy is drawn from the battery) are much less than the negative portions 97 (representing current flow through the diodes as current is returned to the battery). Thus, FIGURE 6 shows a condition at which the rate of charging the battery is relatively great, on the order of 30% of full-load current.

As noted at the beginning of this specification, the output voltage wave from the standby power supply (across leads 40 and 41) is always in phase with the line voltage wave during periods when line control 19 is closed, the voltage sources then being directly connected to each other. The line is a stiff source of voltage, and dominates the soft source formed by the present standby power supply (including ferroresonant transformer 15). Therefore, since the sync signal transmitted from generator 42 to the oscillator and flip-flop 45 is shifted in phase in order to regulate the net energy transfer between the battery and the line, a phase shift must occur across the ferroresonant transformer. When the phase of the inverter output voltage wave (across leads 32 and 34) is such as to attempt (unsuccessfully) to make the transformer output voltage (across leads 40 and 41) lead the line voltage, the current relationships are caused to be such as to effect a net transfer of power from the battery to the line. Conversely, when the phase of the inverter output voltage wave is such as to attempt to make the transformer output voltage lag behind the line voltage, the current relationships are caused to be such as to effect a net transfer of power from the line to the standby system to supply the losses therein or, if the amount of phase retardation is sufficient, to charge the battery.

It is to be understood that the battery normally remains substantially fully charged (with only a few degrees of phase shift, as described relative to FIGURE 5) since the standby power-supply system is not normally allowed to operate for long periods of time after line failure. Thus, there is no substantial phase shift, with consequent distortion, when the supply of line power resumes and the line control 19 is accordingly closed. When the line power fails for relatively long periods of time, it is conventional to connect a diesel-powered generator to the input terminals 11, so the present standby power supply then operates in parallel with the diesel-powered generator and again assures that there will be a continuous supply of power to the line in the event of failure of such generator.

From the above it will be appreciated that the diodes 21 and 22 which are incorporated in the inverter 13 for various purposes known to the art, including the above previously-specified purposes of permitting operation with reactive loads and under lightly-loaded conditions, are employed in accordance with the present invention for an additional important purpose, namely maintaining the battery 14 in charged condition. The need for a separate battery charger, incorporating expensive power diodes or SCR's, with attendant control equipment, is thus completely eliminated.

There will next be described a simple and economical, but highly effective, feedback means for shifting the phase of the voltage output of the standby power-supply system in order to maintain battery 14 charged to the desired degree. The battery charge-control circuit is indicated generally at 101, but also includes the capacitor 49 in the lead 47 from transformer 17 to the sync generator.

The circuit 101 includes a Wheatstone bridge formed by two zener diodes 102 and 103 and two resistors 104 and 105. The cathode of zener 102 is connected to the positive battery lead 36, whereas the anode of such zener is connected through resistor 105 to a negative lead 106 which extends to the negative battery lead 26. Such negative lead 106 is also connected to the anode of the second zener 103, the cathode of such zener being connected through resistor 104 to positive lead 36.

A suitable lamp 107 is interposed in a bridge lead 108 which extends between two bridge junctions 109 and 110, junction 109 being the junction between resistor 104 and zener 103, and junction 110 being the junction between resistor 105 and zener 102. A diode 111 is connected in the bridge lead 108, the cathode of the diode being directly connected to junction 110. Two series-related diodes 112 and 113 are bridged across the lamp or light 107 in order to limit the voltage drop thereacross to approximately two volts, the diodes being so oriented that current may only flow therethrough in a direction from junction 109 to junction 110.

A light-dependent variable resistor 115 is disposed adjacent lamp 107 and is optically coupled thereto, being enclosed therewith in a suitable housing. Such resistor is connected in shunt with the previously-indicated capacitor 49, by means of leads 116 and 117. A relatively low-value resistor 118 is interposed in lead 116, and a relatively high-value resistor 119 is shunted across the light-dependent resistor 115.

Variation in the resistance between leads 116 and 117, as determined by the resistor network, operates in conjunction with capacitor 49 to provide a variable phase-shift effect relative to the signal supplied to sync generator 42 from the sensing transformer 17. The values of the resistors 115, 118 and 119 (and of capacitor 49) are selected empirically in such manner that there will be no net charging or discharging of battery 14 when lamp 107 is dark, the condition then being the same as was described relative to FIGURE 5. The values of the resistors are also so selected that the amount of phase shift will not be greater than desired.

The relationship between the zeners 102 and 103, resistors 104 and 105, and diode 111 is such that lamp 107 will be dark when battery 14 is charged to the desired value or to a higher value, but will become progressively brighter as the battery voltage decreases from the desired value. Such increased brightness effects a reduction in the resistance of the light-dependent resistor 115, and a consequent variation in the resistance-capacitance phase-shift network to effect a retardation in the phase of the sync signal relative to the line voltage wave. A corresponding phase retardation is thus effected in the output voltage wave from the standby power-supply system, so that the battery is charged at a rate determined (within certain limits) by the deviation between the actual battery voltage and the desired maximum battery voltage. Should the battery voltage be in excess of the desired maximum, the lamp 107 will still be dark and there will, therefore, be no battery-charging action.

The above result is accomplished by selecting zeners 102 and 103 having breakdown voltages which add to the desired maximum battery voltage, for example 52 volts for a nominal 48-volt battery. Thus, the breakdown voltage of each zener may be 26 volts. The magnitudes of resistors 104 and 105 may be equal and are correspondingly selected, being such that there will be a 26-volt drop across each resistor 104 and 105 due to current flow therethrough when the battery voltage is 52 volts. Thus, when the battery voltage is 52 volts, there will be no voltage difference between junctions 109 and 110, and lamp 107 will be dark. An increase in the battery voltage will cause the voltage at junction 109 to drop to a lower value than that at junction 110, since the drop across zener 102 remains at 26 volts whereas the voltage drop across resistor 104 will be increased. This, however, will produce no effect since the diode 111 blocks flow of current through lamp 107 in a direction from junction 110 to junction 109.

Should the battery voltage fall to less than 52 volts, there will be a current flow through bulb 107 and diode 111, because of unbalance between junctions 109 and 110. The greater the decrease in battery voltage, the more current will flow through the lamp 107 until the maximum is reached. Such maximum occurs when there is a 2-volt drop across the lamp 107, due to the limiting action of the diodes 112 and 113. Accordingly, the resistance of resistor 115 becomes progressively less to increase the rate of battery charging as previously stated.

As previously noted, the resistors 118 and 119 limit the degree of phase shift caused by the resistance-capacitance network. Thus, when the lamp is dark and the resistance of resistor 115 is infinity, the total resistance in the circuit between leads 116 and 117 is the sum of the values of resistors 118 and 119. Conversely, when the lamp 107 is bright and the risistance of resistor 115 is low, resistor 118 limits the total resistance to a desired value. As indicated heretofore, the degree of phase shift effected by the present charge control is less than 90 degrees from the in-phase condition.

When the line control 19 is open, so that the load is supplied by the standby system, the charge on battery 14 will immediately being to drop. Lamp 107 will then glow brightly, but (obviously) there can be no battery-charging action since the battery is then disconnected from the generator or other source of line voltage.

The described Wheatstone bridge may be replaced by equivalent circuitry, for example a differential amplifier. However, such amplifier preferably incorporates the lamp 107 and associated light-dependent resistor 115.

It is pointed out that the degree of sensitivity of the battery charge control may be increased, and the rate of charging very greatly improved, by removing the lamp 107 and substituting therefor a D.C. amplifier having a lamp connected in its output, such lamp being optically coupled with the resistor 115. In such event, because of the rectifying characteristics of such an amplifier, the diode 111 may be omitted.

It is also to be noted that the lamp 107 may be replaced by a suitable electrical heat source, and the resistor 115 by a thermistor. Thus, the lamp 107 and the heat source may be referred to generically as radiation means, whereas the light-dependent resistor 115 and the thermistor may be referred to generically as radiation-responsive variable resistors.

The references in the present specification and claims relative to retardation of the phase of the output voltage wave from the standby system, in order to achieve charging of the battery, assume that such wave was initially in phase with the line voltage wave. It will be understood, for example, that a high degree of retardation (such as 300 degrees) from the precisely in-phase condition will effect discharging of the battery instead of charging thereof.

*Brief summary of operation*

Assuming that all switches and the line control 19 are originally in open-circuit condition, the closing of switch 37 energizes the relaxation oscillator and flip-flop 45 to drive the gates of SCR's 23 and 24 of inverter 13, the frequency of oscillation being slightly lower than the normal 60 cycles line frequency. The inverter 13 and battery 14 therefore cooperate to supply power to the line through the ferroresonant transformer 15.

Closing of switch 83 energizes the sensing means 17 from the line, and results in operation of sync generator 42. However, the resulting sync signal may not pass to the oscillator and flip-flop 45 until the voltage output from the standby system, as sensed by the transformer 18, is generally in phase with the line voltage. When such generally in-phase condition exists, the sync gate 43 permits passage of sync signal to the oscillator and flip-flop, causing the same, and the associated inverter 13, to be synchronized to the line frequency. The voltage waves on opposite sides of line control 19 are then synchronized in frequency, correlated in magnitude and wave form, and generally in phase. The line control 19 is then closed, and the standby power-supply system is maintained continously in parallel with the line.

When the line voltage decreases excessively due to a short or break in the line, or to some other condition, the line control 19 opens and causes the standby power-supply system to be the sole supplier of power to line output terminals 12 leading to the load. When power is again supplied to the line input terminals 11, the line control 19 senses such power to assure that the proper line voltage wave is present, and then closes to re-connect the line in parallel with the standby power-supply system.

The battery 14 of the system is maintained charged from the line, without at any time disabling the standby power-supply system or disconnecting it from the line, by shifting the phase of the voltage output from the standby power-supply system relative to the line voltage wave. Such phase-shift action is effected automatically by the battery charge control 101 which cooperates with capacitor 49 to shift the phase of the signal delivered to sync generator 42 from line transformer 17.

It is to be understood that the inverter 13 may be reverse oriented, without departing from the scope of the invention. Thus, lead 36 is connected to the negative terminal of battery 14, lead 26 is connected to the positive battery terminal, and each element 21–24 is reversed. The SCR gates are then transformer coupled to circuit 45, instead of being direct coupled as in the present illustration (it being understood that the gates in the present circuit may also be transformer coupled). Leads 26 and 36 may be referred to as the "input" (or "conventional input") of the inverter 13, whereas leads 32 and 34 may be referred to as the "output" (or "conventional output") thereof.

The foregoing detailed description is to be clearly understood as given by way of illustration and example only, the spirit and scope of this invention being limited solely by the appended claims.

I claim:

1. Apparatus for effecting a controlled exchange of power between a storage battery and a source of power producing an alternating voltage wave, which comprises:
   an inverter adapted to permit flow of current in both directions therethrough,
   means to connect said inverter to said source and to a storage battery in such manner that flow of current through said inverter in one direction effects feeding of power from said battery to said source, and flow of current through said inverter in the opposite direction effects charging of said battery from said source, means to synchronize the frequency of the voltage wave generated by said inverter to the frequency of said source voltage wave, and means to shift the phases of said voltage waves relative to each other to regulate the net power exchange between said inverter and said source, said phase-shift means including control means sensitive to the condition of said battery to provide a continuous phase control effect maintaining said battery at a predetermined condition of charge.

2. Apparatus for effecting a controlled exchange of energy between an inverter and a power line through which an A.C. voltage wave having a predetermined frequency, magnitude and wave form is normally passed, which comprises:

an SCR inverter having SCR's adapted to permit flow of current therethrough in one direction and also having diodes adapted to permit flow of current therethrough in the opposite direction, means to connect said inverter to said power line and to a storage battery in such manner that flow of current through said inverter in one direction effects feeding of energy from said battery to said line, and flow of current through said inverter in the opposite direction effects charging of said battery from said line, means to synchronize the frequency of the voltage wave generated by said inverter to the frequency of the line voltage wave, and means to shift controllably the phase of said voltage wave generated by said inverter relative to said line voltage wave to thereby regulate the net energy exchange between said inverter and said line, said last-named means including feedback means responsive to the voltage of said battery to retard automatically the phase of said voltage wave generated by said inverter relative to said line voltage wave when the voltage across said battery drops below a predetermined value.

3. Apparatus for effecting a controlled exchange of energy between a battery and a power source producing an alternating voltage wave, which comprises:

a storage battery, a bidirectional inverter connected between said storage battery and said source, said inverter being adapted to generate an A.C. output voltage wave, means to synchronize said output voltage wave from said inverter to said voltage wave from said source, and means responsive to the voltage across said battery to retard the phase of said output voltage wave from said inverter relative to said source voltage wave when said voltage across said battery drops below a predetermined value, said last-named means comprising a feedback circuit connected to said battery and incorporating phase-control circuitry for retarding the phase of said inverter wave.

4. Apparatus for effecting a controlled power exchange between a battery and a source of A.C. power, which comprises:

a ferroresonant transformer connected to said power source, a storage battery, a bidirectional inverter connected between said ferroresonant transformer and said battery whereby flow of current through said inverter in one direction effects supply of power from said battery to said power source and flow of current through said inverter in the opposite direction effects charging of said battery from said power source, means operably associated with said power source to synchronize the frequency of the voltage wave supplied to said transformer by said inverter to the frequency of the voltage wave from said power source, and means to adjust the phase of said voltage wave supplied to said transformer by said inverter relative to said voltage wave from said power source to thereby control the net energy exchange between said battery and said power source, said last-named means including feedback means responsive automatically to the voltage across said battery to retard the phase of said voltage wave supplied to said transformer by said inverter relative to said voltage wave from said source to thereby effect charging of said battery from said source.

5. Apparatus for effecting charging of a battery from an A.C. power line through which a line voltage wave having a predetermined magnitude, a sixty-cycle frequency and a sinusoidal wave form is normally passed, which apparatus comprises:

a ferroresonant transformer having output winding means adapted to be connected across said line, said output winding means having connected therewith a capacitor, a parallel square-wave SCR inverter having two SCR's the anodes of which are connected to the input winding of said transformer, said inverter also having two clamping diodes the cathodes of which are connected to said input winding of said transformer, means to connect the anodes of said diodes and the cathodes of said SCR's to the negative terminal of a storage battery, means to connect the positive terminal of said storage battery to a center tap in said input winding of said transformer, a relaxation oscillator adapted to drive the gates of said SCR's, means to synchronize the frequency of said oscillator relative to that of said line voltage wave in such manner as to match the frequency of said inverter to that of said line voltage wave, and means associated with said oscillator to retard the phase of the output signal therefrom and thus the phase of the voltage output of said inverter relative to said line voltage wave in order to effect charging of said battery from said line, said phase-retarding means including a battery charge control means responsive to the voltage across said battery to effect said retardation in the phase of said oscillator output when the charge on said battery is less than a predetermined desired value.

6. A continuously-operating standby power-supply system and battery-charging means adapted to be employed in connection with a power line through which a line voltage wave having a predetermined magnitude, predetermined frequency and sinusoidal wave form is normally passed, which comprises:

a ferroresonant transformer having output winding means adapted to be connected across said line, said output winding means having connected therewith a capacitor, a parallel square-wave SCR inverter having two SCR's the anodes of which are connected to the input winding of said transformer, said inverter also having two clamping diodes the cathodes of which are connected to said input winding of said transformer, means to connect the anodes of said diodes and the cathodes of said SCR's to the negative terminal of a storage battery, means to connect the positive terminal of said storage battery to a center tap on said input winding of said transformer, an oscillator connected to drive the gates of said SCR's,
a line control adapted to be interposed in said line to open the same when the characteristics of said line voltage wave are not within a predetermined desired range,
a sync generator,
means to associate the input of said sync generator with said line on the input side of said line control whereby said sync generator generates a signal the frequency of which is determined by that of said line voltage wave,
a sync gate connected between said sync generator and said oscillator and preventing transmission of sync signal from said sync generator to said oscillator except when the output voltage wave from said transformer output winding means is generally in phase with said line voltage wave during periods when said line control is in open-circuit condition,
whereby closing of said line control effects both frequency and general phase correlation between said line voltage wave and said output voltage wave from said transformer and in the absence of undesired transient conditions, and
a battery charge control responsive to the voltage across said battery and adapted automatically upon a decrease in the voltage across said battery to retard the phase of said sync signal from said sync generator, thereby effecting charging of said battery from said line through said transformer and inverter.

7. A standby power-supply and battery-charging system for use in conjunction with an A.C. power line having at least one A.C. voltage wave therein, which comprises:
an inverter adapted to permit flow of current in both directions therethrough,
circuit means to maintain said inverter continuously connected to said line,
circuit means to connect a storage battery to said inverter in such manner that flow of current through said inverter in one direction effects supplying of energy from said battery to said line, and flow of current through said inverter in the opposite direction effects charging of said battery from said line,
means to synchronize the frequency of the voltage wave generated by said inverter to the frequency of the voltage wave present in said line, and
circuit means to effect rapid recharging of said battery from said line after the battery charge has been depleted due to supplying power from said battery and said inverter to said line during a period of failure of said voltage wave normally present in said line,
said circuit means including means to retard the phase of said voltage wave generated by said inverter, relative to the phase of said line voltage wave, by an amount greatly in excess of twelve degrees.

8. The invention as claimed in claim 7, in which said phase-retarding means effects retardation of the phase of said voltage wave generated by said inverter, relative to the phase of said line voltage wave, by an amount on the order of sixty degrees.

9. A sandby power-supply and battery-charging system for use in conjunction with an A.C. power line having at least one A.C. voltage wave therein, which comprises:
an inverter adapted to permit flow of current in both directions therethrough,
circuit means to maintain said inverter continuously connected to said line,
circuit means to connect a storage battery to said inverter in such manner that flow of current through said inverter in one direction effects supplying of energy from said battery to said line, and flow of current through said inverter in the opposite direction effects charging of said battery from said line,
means to synchronize the frequency of the voltage wave generated by said inverter to the frequency of the voltage wave present in said line, and
circuit means to effect rapid recharging of said battery from said line after the battery charge has been depleted due to supplying of power from said battery and said inverter to said line during a period of failure of said voltage wave normally present in said line,
said circuit means including phase-control means responsive to the voltage on said battery to retard the phase of said voltage wave generated by said inverter, relative to said line voltage wave, by an amount which increases progressively with decreasing battery voltage below the normal battery voltage, and which decreases progressively as said battery voltage increases toward normal during the battery-charging process.

10. A method of providing standby battery power for an A.C. power line containing an A.C. voltage wave, and of maintaining the standby battery charged to a predetermined voltage, which comprises:
maintaining continuously connected to an A.C. power line a bidirectional inverter supplied by a storage battery,
synchronizing the frequency of the voltage wave generated by said inverter to the frequency of the A.C. voltage wave on said line, and
continuously controlling, in response to at least one circuit condition determined by the charge on said storage battery, the phase relationship between said inverter voltage wave and said line voltage wave,
said phase controlling step being conducted in such manner that said inverter voltage wave lags said line voltage wave and by different amounts which are related to the degree of depletion of the charge on said battery, the phase lag being greater when said battery is fully discharged, and smaller when said battery is substantially fully charged.

11. The invention as claimed in claim 10, in which said method further comprises maintaining said phase lag in the range of about eight degrees to about twelve degrees when said battery is substantially fully charged, and at an amount on the general order of sixty degrees when said battery is substantially fully discharged.

12. The invention as claimed in claim 11, in which said method further comprises progressively diminishing the amount of said lag as said battery approaches fully-charged condition.

13. A method of providing standby battery power for an A.C. power line containing at least one A.C. voltage wave, and of maintaining the standby battery charged to a predetermined voltage without the necessity of providing auxiliary battery charging circuitry, which method comprises:
maintaining continuously connected to an A.C. power line, through a ferroresonant circuit, a bidirectional SCR inverter incorporating diodes and supplied by a storage battery,
maintaining the frequency of the voltage wave generated by said inverter continuously synchronized to the frequency of the A.C. voltage wave on said line, and
employing the voltage on said battery to effect continuous control of the phase difference between said inverter voltage wave and said line voltage wave,
said phase-controlling step being conducted in such manner that said inverter voltage wave lags said line voltage wave by different amounts which are related to the degree of depletion of the charge on said battery, the phase lag being greater when the battery charge depletion is maximum, and smaller when said battery is substantially fully charged.

14. The invention as claimed in claim 13, in which said method further comprises maintaining said phase lag in the range of about eight degrees to about twelve degrees when said battery is substantially fully charged, and at an amount on the general order of sixty degrees when said battery is substantially fully discharged.

15. The invention as claimed in claim 14, in which said method further comprises progressively diminishing the amount of said lag as said battery approaches fully-charged condition.

References Cited

UNITED STATES PATENTS

| 1,951,482 | 3/1934 | Holden | 307—64 |
| 2,263,320 | 11/1941 | Trucksees | 307—64 |
| 2,470,838 | 5/1949 | Stoller | 307—64 |
| 3,229,111 | 1/1966 | Schumacher | 307—66 X |

ORIS L. RADER, *Primary Examiner.*

T. J. MADDEN, *Assistant Examiner.*